(12) United States Patent
Mukaida et al.

(10) Patent No.: US 11,964,744 B2
(45) Date of Patent: Apr. 23, 2024

(54) AUTONOMOUS UNDERWATER VEHICLE

(71) Applicant: KAWASAKI JUKOGYO KABUSHIKI KAISHA, Kobe (JP)

(72) Inventors: Minehiko Mukaida, Kobe (JP); Kosuke Masuda, Kobe (JP); Shinichi Miyata, Kobe (JP); Noriyuki Okaya, Kobe (JP); Kazuyuki Nakamura, Kobe (JP); Satoshi Hashimoto, Akashi (JP); Yusuke Okimura, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 811 days.

(21) Appl. No.: 17/047,309

(22) PCT Filed: Apr. 10, 2019

(86) PCT No.: PCT/JP2019/015651
§ 371 (c)(1),
(2) Date: Oct. 13, 2020

(87) PCT Pub. No.: WO2019/198761
PCT Pub. Date: Oct. 17, 2019

(65) Prior Publication Data
US 2021/0155330 A1    May 27, 2021

(30) Foreign Application Priority Data

Apr. 10, 2018   (JP) .................................. 2018-075748

(51) Int. Cl.
*B63G 8/00* (2006.01)
*B63B 79/40* (2020.01)
(Continued)

(52) U.S. Cl.
CPC ............. *B63G 8/001* (2013.01); *B63B 79/40* (2020.01); *B63C 11/52* (2013.01); *G05D 1/0088* (2013.01);
(Continued)

(58) Field of Classification Search
CPC .. B63G 8/001; B63G 2008/004; B63B 79/40; B63C 11/52; G05D 1/0088; G05D 1/0094; G05D 1/048
See application file for complete search history.

(56) References Cited

U.S. PATENT DOCUMENTS 9,498,883 B2 * 11/2016 Jun ...................... B25J 9/1602
2005/0066872 A1   3/2005 Geriene et al.
(Continued)

FOREIGN PATENT DOCUMENTS

JP   H05-254487 A   10/1993
JP   5806568 B2   11/2015
(Continued)

*Primary Examiner* — Mary Cheung
(74) *Attorney, Agent, or Firm* — Oliff PLC

(57) ABSTRACT

An AUV includes: an underwater vehicle main body configured to sail along an inspection object located in water or on the bottom of the water; an arm extending from the underwater vehicle main body; an inspection tool portion including a contact portion configured to contact the inspection object and an inspection device configured to inspect the inspection object; and a passive joint provided between the arm and the inspection tool portion and configured to allow passive rotation of the inspection tool portion relative to the arm about at least one axis.

20 Claims, 7 Drawing Sheets

(51) Int. Cl.
 *B63C 11/52* (2006.01)
 *G05D 1/00* (2006.01)
(52) U.S. Cl.
 CPC ........... *G05D 1/0094* (2013.01); *G05D 1/048* (2013.01); *B63G 2008/004* (2013.01)

(56) References Cited

U.S. PATENT DOCUMENTS

2008/0284441 A1* 11/2008 Kowalczyk ............ G01V 3/104
 324/334
2014/0230713 A1 8/2014 Kimura et al.
2018/0079086 A1 3/2018 Patel et al.

FOREIGN PATENT DOCUMENTS

| KR | 10-2015-0052617 A | | 5/2015 |
| KR | 2015052617 A | * | 5/2015 |
| WO | 01/36265 A1 | | 5/2001 |

* cited by examiner

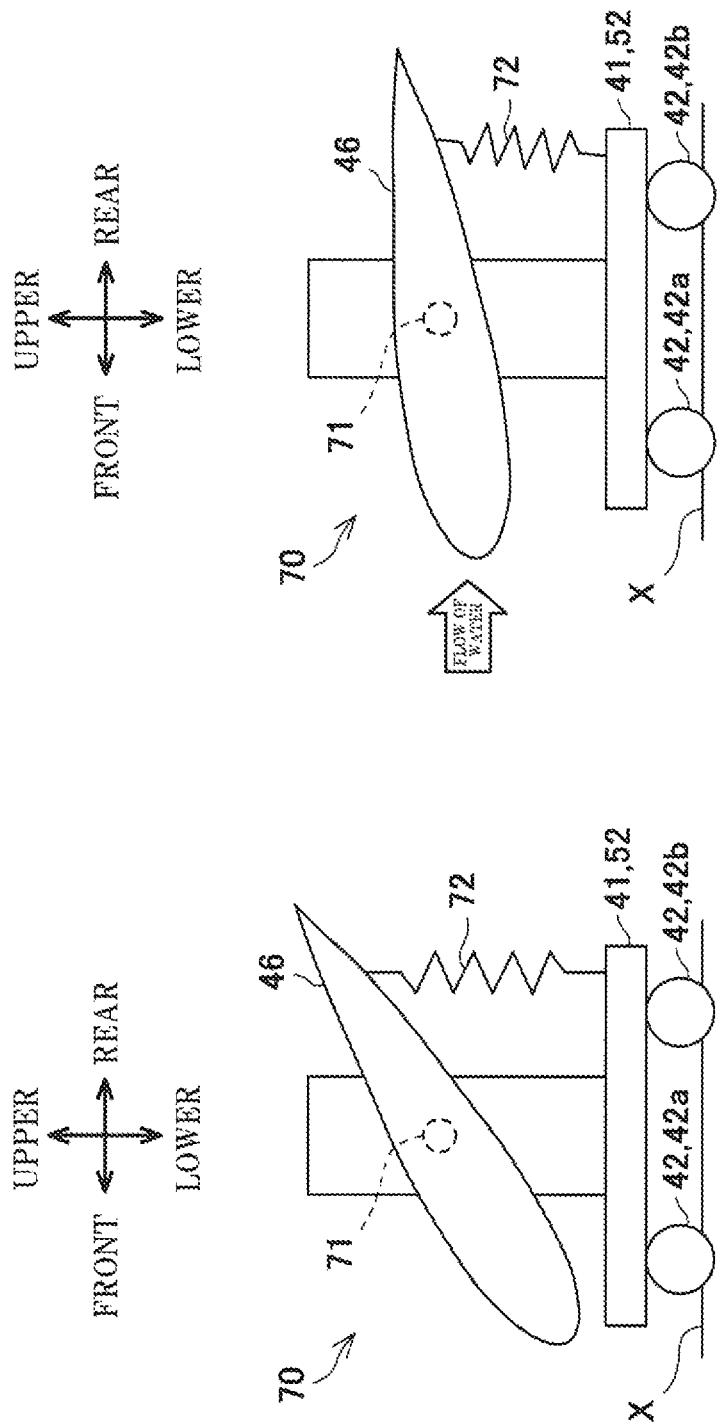

AUTONOMOUS UNDERWATER VEHICLE

TECHNICAL FIELD

The present invention relates to an autonomous underwater vehicle which inspects seabed pipelines, seabed structures, and the like.

BACKGROUND ART

Seabed pipelines, seabed structures, and the like need to be periodically inspected in terms of corrosion, the degree of deterioration, etc. For example, PTL 1 discloses an autonomous underwater vehicle (hereinafter may be referred to as an "AUV") which inspects a seabed pipeline while sailing along the seabed pipeline.

The AUV disclosed in PTL 1 includes: an underwater vehicle main body which sails while tracing the seabed pipeline that is an inspection object; an articulated robot arm including a base end portion coupled to a rear portion of the underwater vehicle main body; an inspection tool portion attached to a tip end portion of the robot arm; and a control portion. The control portion controls a plurality of driving portions of the robot arm to operate the robot arm such that the inspection tool portion realizes a predetermined positional relation relative to the seabed pipeline.

CITATION LIST

Patent Literature

PTL 1: Japanese Patent No. 5806568

SUMMARY OF INVENTION

Technical Problem

According to the above AUV, even when the direction of the underwater vehicle main body relative to the inspection object changes during sailing, the direction of the inspection tool portion relative to the inspection object can be maintained to be a target direction by driving the driving portions of the robot arm. With this, the improvement of the inspection accuracy can be expected. In the above AUV, the operations of the driving portions of the robot arm use electric power of a battery incorporated in the underwater vehicle main body. When the electric power of the battery decreases, the AUV needs to surface in order to charge the battery. Therefore, in order to efficiently proceed with inspection work, the consumption of the electric power of the battery of the AUV is desired to be suppressed as much as possible.

An object of the present invention is to provide an AUV capable of inspecting an inspection object with a high degree of accuracy while suppressing consumption of electric power of a battery incorporated in the AUV.

Solution to Problem

In order to solve the above problems, an AUV according to the present invention includes: an underwater vehicle main body configured to sail along an inspection object located in water or on a bottom of the water; an arm extending from the underwater vehicle main body; an inspection tool portion including a contact portion configured to contact the inspection object and an inspection device configured to inspect the inspection object; and a passive joint provided between the arm and the inspection tool portion and configured to allow passive rotation of the inspection tool portion relative to the arm about at least one axis.

According to the above configuration, even when the direction of the underwater vehicle main body relative to the inspection object changes to some extent, the inspection tool portion passively rotates relative to the arm about at least one axis, and therefore, the rotational displacement of the underwater vehicle main body can be prevented from being transmitted to the inspection tool portion without using an actuator. With this, the direction of the inspection tool portion relative to the inspection object about at least one axis can be maintained. Therefore, the inspection object can be inspected with a high degree of accuracy while suppressing consumption of electric power of a battery incorporated in the underwater vehicle main body.

In the above AUV, the passive joint may allow the passive rotation of the inspection tool portion relative to the arm about three axes perpendicular to each other. According to this configuration, even when the direction of the underwater vehicle main body relative to the inspection object is changed to any direction, the rotational displacement of the underwater vehicle main body can be prevented from being transmitted to the inspection tool portion.

In the above AUV, the inspection object may extend in a predetermined direction in the water or on the bottom of the water. The contact portion may contact the inspection object so as to sandwich the inspection object in a width direction of the inspection object. The at least one axis may include an axis perpendicular to both an extending direction in which the inspection object extends and the width direction. According to this configuration, the contact portion contacts the inspection object so as to sandwich the inspection object in the width direction. Therefore, even when the direction of the underwater vehicle main body relative to the inspection object changes about an axis perpendicular to both the extending direction and width direction of the inspection object, the passive joint can allow the passive rotation of the inspection tool portion relative to the arm such that the inspection tool portion is prevented from rotating about the axis by contact force acting on the contact portion in the width direction from the inspection object.

In the above AUV, when the contact portion is not in contact with the inspection object, a rotational position of the inspection tool portion relative to the arm about the at least one axis may be a neutral position. The autonomous underwater vehicle may include a biasing member configured to, when the inspection tool portion rotates relative to the arm from the neutral position, generate biasing force acting in such a direction that the inspection tool portion returns to the neutral position. According to this configuration, when the contact portion is not in contact with the inspection object, the rotational position of the inspection tool portion relative to the arm is the neutral position, and therefore, the inspection tool portion in a desired posture can be made to approach the inspection object.

In the above AUV, the underwater vehicle main body may include: a driving portion configured to drive the arm such that the inspection tool portion moves between a work position at which the contact portion contacts the inspection object and a stand-by position located closer to the underwater vehicle main body than the work position; and a cover portion overlapping the arm so as to hide the arm when the inspection tool portion is located at the stand-by position in a front view of the underwater vehicle main body. According to this configuration, when the inspection tool portion is located at the stand-by position, the water resistance received by the arm can be suppressed.

In the above AUV, the inspection tool portion may include a contact detecting portion configured to detect contact of the contact portion with the inspection object. According to this configuration, whether or not the inspection tool portion is in a state of being able to inspect the inspection object can be quickly determined by utilizing a signal of the contact detecting portion.

In the above AUV, the underwater vehicle main body may include: a driving portion configured to drive the arm to move the inspection tool portion; and a controller configured to control the driving portion. The autonomous underwater vehicle may include: an interval changing mechanism configured to narrow an interval between the passive joint and the contact portion as pressing force of pressing the contact portion against the inspection object increases; and an interval detecting portion configured to detect the interval. The controller may control the driving portion based on a detection signal of the interval detecting portion such that the interval falls within a predetermined range. According to this configuration, since the interval between the passive joint and the contact portion is made to fall within the predetermined range, the contact portion is prevented from excessively pressing the inspection object, or the contact portion is prevented from separating from the inspection object.

In the above AUV, the inspection tool portion may include a blade member configured to receive a flow of the water to generate force acting in such a direction that the contact portion is pressed against the inspection object. According to this configuration, when the underwater vehicle main body sails, the flow of the water is generated around the blade member. When the blade member receives the flow of the water, the contact portion is pressed against the inspection object. Therefore, the contact portion hardly separates from the inspection object.

In the above AUV, the inspection tool portion may include an inclination changing mechanism configured to change an inclination of the blade member relative to the inspection object in accordance with a flow velocity of the water received by the blade member such that the force generated by the blade member is maintained within a predetermined range. According to this configuration, the force of pressing the contact portion against the inspection object can be prevented from becoming excessive by changing the inclination of the blade member.

Advantageous Effects of Invention

The present invention can provide the AUV capable of inspecting the inspection object with a high degree of accuracy while suppressing the consumption of the electric power of the battery incorporated in the AUV.

BRIEF DESCRIPTION OF DRAWINGS

FIGS. 7A and 7B are schematic side views showing the inspection tool portion of FIG. 3 to explain an inclination changing mechanism of the inspection tool portion.

DESCRIPTION OF EMBODIMENTS

Hereinafter, an AUV according to one embodiment of the present invention will be described with reference to the drawings.

Figure 1:
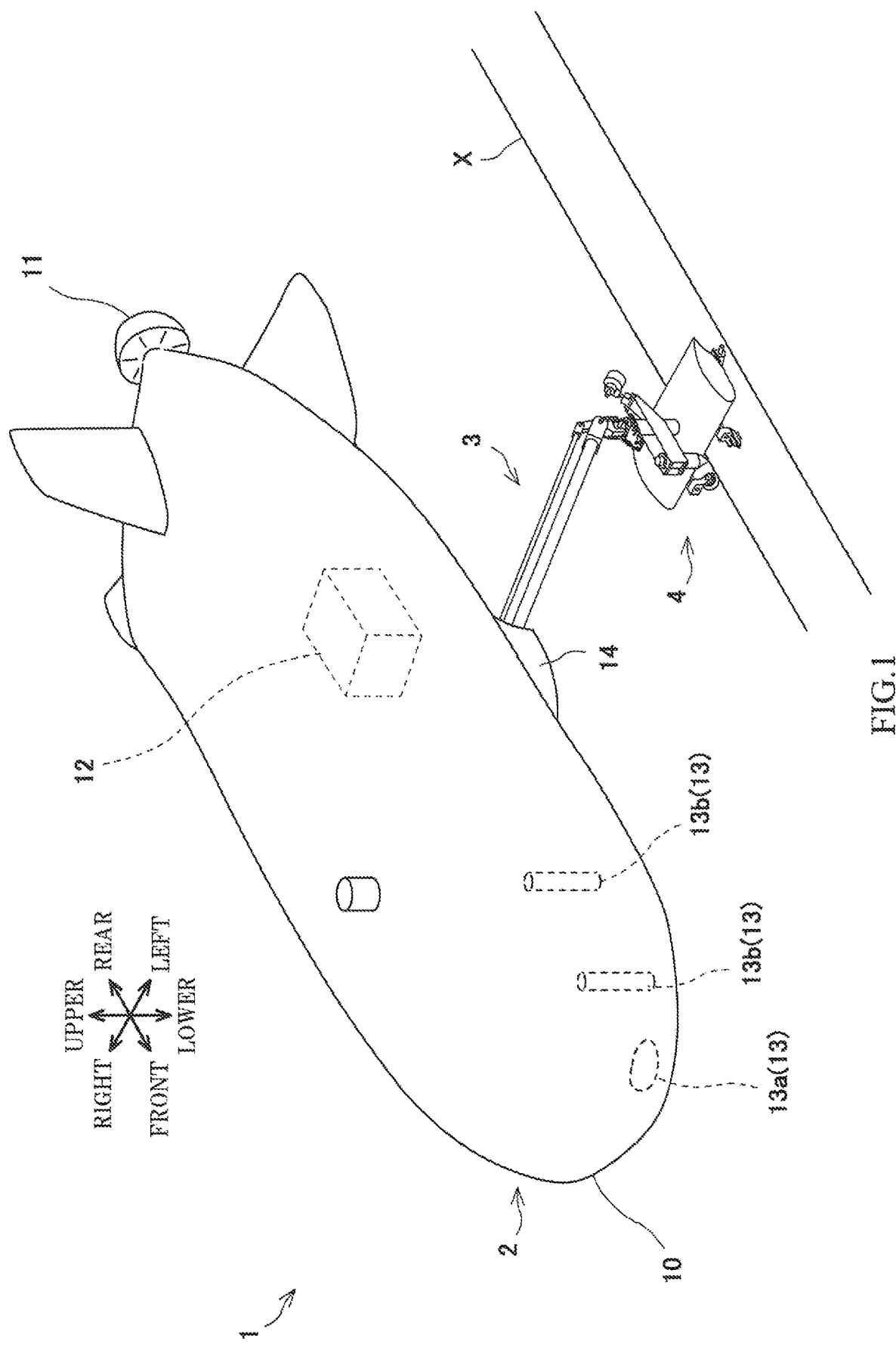
FIG. 1 is a perspective view of an AUV according to one embodiment of the present invention.

FIG. 1 is a perspective view of an AUV 1 according to one embodiment of the present invention. In the present embodiment, the AUV 1 inspects an inspection object located in water or on the bottom of the water while sailing in the water. In the present embodiment, the inspection object is a seabed pipeline X. The seabed pipeline X extends in a predetermined direction in the water or on the bottom of the water and includes an outer surface having a circular section perpendicular to an extending direction in which the seabed pipeline X extends. In the description and claims of the present application, the "water" denotes a liquid, such as sea or a lake, in which the AUV 1 can sail, and for example, "in the water" denotes "in the sea, "in the lake," or the like.

The AUV 1 includes an underwater vehicle main body 2, a robot arm 3 extending from the underwater vehicle main body 2, and an inspection tool portion 4 moved by the robot arm 3. In the present embodiment, the underwater vehicle main body 2 sails along the seabed pipeline X without contacting the seabed pipeline X while bringing the inspection tool portion 4 into contact with the seabed pipeline X.

A normal posture of the underwater vehicle main body 2 with respect to a sailing direction is predetermined. In the following description regarding the underwater vehicle main body 2, a sailing direction of the underwater vehicle main body 2 in the normal posture is defined as a front direction, and a direction opposite to the sailing direction is defined as a rear direction. Moreover, left, right, upper, and lower sides in the sailing direction are defined as left, right upper, and lower sides, respectively. The normal posture with respect to the sailing direction is such a posture that a straight line connecting predetermined front and rear ends of the underwater vehicle main body 2 is substantially parallel to the sailing direction. To be specific, the normal posture is not such a posture that the straight line connecting the front and rear ends of the underwater vehicle main body 2 is oblique with respect to the sailing direction (for example, the normal posture is not a posture in an exceptional case where when the underwater vehicle main body 2 sails in the water in which the direction of tidal current is oblique with respect to the sailing direction, the direction of the underwater vehicle main body 2 becomes oblique with respect to the sailing direction so as to correspond to the tidal current).

The underwater vehicle main body 2 includes: a main body portion 10 configured to accommodate a battery; a thrust generator 11 provided at the main body portion 10; and a controller 12 configured to control the thrust generator 11. A front portion of the main body portion 10 has a streamline shape that is low in water resistance. Upper and lower portions of the main body portion 10 have respective planar shapes that are parallel to each other.

The thrust generator 11 includes a main propulsion thruster and thrusters used for posture control, route fine adjustment, and the like. In FIG. 1, only the main propulsion thruster is shown, and the other thrusters are omitted.

The controller 12 controls the thrust generator 11 such that the main body portion 10 sails while tracing the seabed pipeline X without contacting the seabed pipeline X. In the present embodiment, the underwater vehicle main body 2 includes a detecting portion 13 configured to acquire inspection object information used to specify or presume the position of the seabed pipeline X relative to the main body portion 10. Then, the controller 12 controls the thrust generator 11 based on the acquired inspection object information such that the main body portion 10 sails while tracing the seabed pipeline X without contacting the seabed pipeline X.

In the present embodiment, the detecting portion 13 includes a first detecting portion 13a and two second detecting portions 13b. The first detecting portion 13a is a multibeam sonar. As shown in FIG. 1, the first detecting portion 13a is provided at a front-lower portion of the main body portion 10 and mainly collects middle-distance front-side inspection object information. The middle-distance front-side inspection object information denotes information regarding a middle-distance state of the seabed pipeline X and its vicinity, such as information regarding the degree of bending of the seabed pipeline X at a middle-distance front-side position.

The two second detecting portions 13b are shape recognition lasers. As shown in FIG. 1, the two second detecting portions 13b are provided at a lower surface of the main body portion 10 so as to be spaced apart from each other in the front-rear direction. These two shape recognition laser mainly collect short-distance front-side inspection object information based on a relative positional difference therebetween. The short-distance front-side inspection object information denotes information regarding a short-distance state of the seabed pipeline X and its vicinity, such as inspection object information regarding the degree of bending of the seabed pipeline X at a short-distance front-side position.

Figure 2:
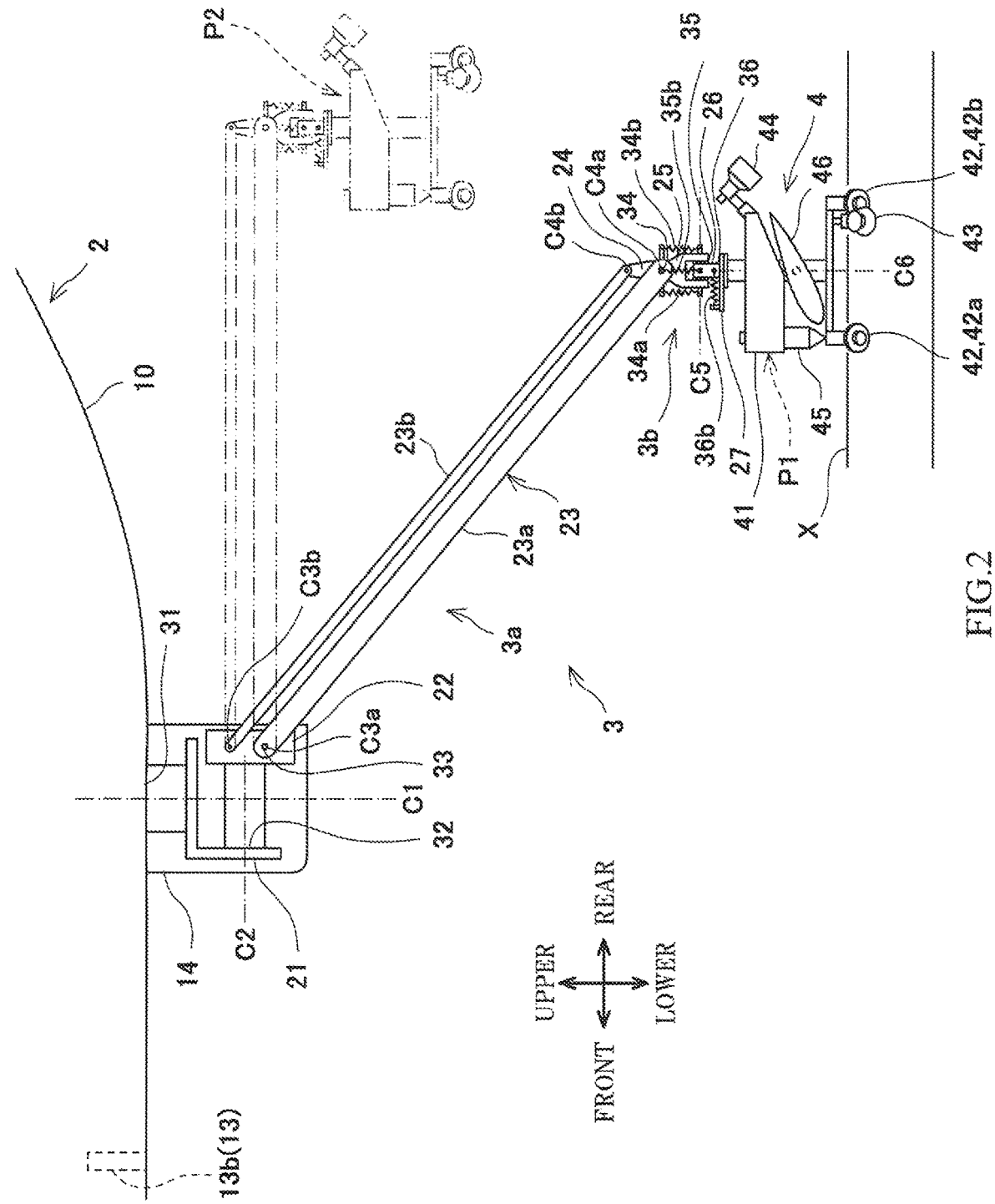
FIG. 2 is a partial side view showing a lower portion of the AUV shown in FIG. 1.

FIG. 2 is a partial side view showing a lower portion of the AUV 1. As shown in FIG. 2, the robot arm 3 is constituted by coupling first to seventh links 21 to 27. The robot arm 3 is a six-axis vertical articulated robot arm. The robot arm 3 includes first to sixth joints 31 to 36 lined up in this order from a base end side toward a tip end side.

The first link 21 is coupled to the underwater vehicle main body 2 through the first joint 31 so as to be rotatable relative to the underwater vehicle main body 2. The second link 22 is coupled to the first link 21 through the second joint 32 so as to be rotatable relative to the first link 21. The third link 23 is coupled to the second link 22 through the third joint 33 so as to be rotatable relative to the second link 22. The fourth link 24 constitutes a parallel link mechanism together with the second link 22 and the third link 23. To be specific, when the position of the third link 23 relative to the second link 22 is determined, the position of the fourth link 24 relative to the third link 23 is uniquely determined. The fifth link 25 is coupled to the fourth link 24 through the fourth joint 34 so as to be rotatable relative to the fourth link 24. The sixth link 26 is coupled to the fifth link 25 through the fifth joint 35 so as to be rotatable relative to the fifth link 25. The seventh link 27 is coupled to the sixth link 26 through the sixth joint 36 so as to be rotatable relative to the sixth link 26.

The first link 21 is located lower than the lower surface of the main body portion 10. The first link 21 is coupled to the main body portion 10 through the first joint 31 so as to be rotatable about a first axis C1 perpendicular to the lower surface of the main body portion 10. A first driving portion 61 (see FIG. 6) which is not shown in FIG. 2 is provided at the first joint 31. The first driving portion 61 rotates the first link 21 relative to the main body portion 10 about the first axis C1.

The second link 22 is coupled to the first link 21 through the second joint 32 so as to be rotatable about a second axis C2 perpendicular to the first axis C1. A second driving portion 62 (see FIG. 6) which is not shown in FIG. 2 is provided at the second joint 32. The second driving portion 62 rotates the second link 22 relative to the first link 21 about the second axis C2.

The third link 23 is constituted by a pair of elongated third link members 23a and 23b that are parallel to each other. One longitudinal end of the third link member 23a is coupled to the second link 22 so as to be rotatable about a third axis C3a perpendicular to both the first axis C1 and the second axis C2, and one longitudinal end of the third link member 23b is coupled to the second link 22 so as to be rotatable about a third axis C3b perpendicular to both the first axis C1 and the second axis C2. Moreover, the other longitudinal end of the third link member 23a is coupled to the fourth link 24 so as to be rotatable about a fourth axis C4a parallel to the third axis C3a, and the other longitudinal end of the third link member 23b is coupled to the fourth link 24 so as to be rotatable about a fourth axis C4b parallel to the third axis C3b.

A third driving portion 63 (see FIG. 6) which is not shown in FIG. 2 is provided at the third joint 32. The third driving portion 63 rotates the third link member 23a relative to the second link 22 about the third axis C3a. As described above, the fourth link 24 constitutes the parallel link mechanism together with the second link 22 and the third link 23. Therefore, when the third link member 23a rotates, the third link member 23b also rotates so as to maintain a parallel state with respect to the third link member 23a. To be specific, the third axis C3a is an axis of a driving shaft, and the third axis C3b is an axis of a driven shaft.

The fifth link 25 is coupled to the fourth link 24 through the fourth joint 34 so as to be rotatable about the fourth axis C4a. The sixth link 26 is coupled to the fifth link 25 through the fifth joint 35 so as to be rotatable about a fifth axis C5 perpendicular to the fourth axis C4a. The seventh link 27 is coupled to the sixth link 26 through the sixth joint 36 so as to be rotatable about a sixth axis C6 perpendicular to both the fourth axis C4a and the fifth axis C5. The inspection tool portion 4 is connected to the seventh link 27.

As described above, the first to third driving portions 61 to 63 are provided at the first to third joints 31 to 33, respectively. Therefore, the first to third joints 31 to 33 are active joints. The first to third driving portions 61 to 63 are, for example, servomotors. The first to third joints 31 to 33 are provided with respective position sensors (not shown) configured to detect rotation angle positions of the corresponding servomotors. The controller 12 controls the first to third driving portions 61 to 63 based on rotation angle position information from the position sensors.

In the following description, portions of the robot arm 3 which portions can be controlled in terms of position relative to the underwater vehicle main body 2, i.e., the first to fourth links 21 to 24 of the robot arm 3 are called an active arm portion 3a. The active arm portion 3a corresponds to an "arm" of the present invention, and the first to third driving portions 61 to 63 configured to drive the active arm portion 3a correspond to a "driving portion" of the present invention.

Unlike the first to third joints 31 to 33, each of the fourth to sixth joints 34 to 36 is not provided with the driving portion. To be specific, the fourth to sixth joints 34 to 36 are passive joints. The fourth to sixth joints 34 to 36 allow passive rotation of the inspection tool portion 4 relative to the active arm portion 3a.

In the following description, the fifth to seventh links 25 to 27 of the robot arm 3 are called a passive arm portion 3b.

In the present embodiment, when performing inspection work by using the inspection tool portion 4, the controller 12 operates the active arm portion 3a such that the inspection tool portion 4 moves to such a position (work position) P1 as to contact the seabed pipeline X.

The third link 23 (specifically, the third link members 23a and 23b) arranged between the first to third joints 31 to 33 (i.e., the active joints) at the base end side and the fourth to sixth joints 34 to 36 (i.e., the passive joints) at the tip end side is formed longer than the other links. Specifically, the controller 12 controls the thrust generator 11 such that: the main body portion 10 does not contact the seabed pipeline X when tracing the seabed pipeline X; and the main body portion 10 traces the seabed pipeline X while securing a predetermined distance (range) from the seabed pipeline X. The third link 23 has such an adequate length that the inspection tool portion 4 can be brought into contact with the seabed pipeline X even from the main body portion 10 located away from the seabed pipeline X by the predetermined distance.

When not performing the inspection by using the inspection tool portion 4 (such as when approaching the seabed pipeline X for performing the inspection work or when floating from the vicinity of the seabed pipeline X in the middle of the inspection or after the termination of the inspection), the controller 12 operates the active arm portion 3a such that as shown by two-dot chain lines in FIG. 2, the inspection tool portion 4 stands by at a predetermined position (stand-by position) P2 that is closer to the underwater vehicle main body 2 than the work position P1. In the present embodiment, the stand-by position P2 is a position of the inspection tool portion 4 when the second axis C2 extends in the front-rear direction of the underwater vehicle main body 2, and the third link 23 extends horizontally in the front-rear direction of the underwater vehicle main body 2.

As shown in FIG. 2, a cover portion 14 is provided at the lower surface of the main body portion 10 so as to project downward from the lower surface. The cover portion 14 reduces the water resistance received by the robot arm 3 when the underwater vehicle main body 2 sails. The cover portion 14 in a range from its front portion to its side portion has a streamline shape that is low in water resistance. A rear portion of the cover portion 14 is open, and the active arm portion 3a projects rearward from this opening. The cover portion 14 and the active arm portion 3a are configured so as not to interfere with each other when the active arm portion 3a operates within a predetermined operating range.

In a front view of the underwater vehicle main body 2 (in the present embodiment, when viewed from the front side in the sailing direction in which the underwater vehicle main body 2 sails), the cover portion 14 overlaps the active arm portion 3a so as to hide the active arm portion 3a when the inspection tool portion 4 is located at the stand-by position P2. Therefore, when the inspection tool portion 4 is located at the stand-by position P2, the water resistance received by the active arm portion 3a can be suppressed.

Figure 3:
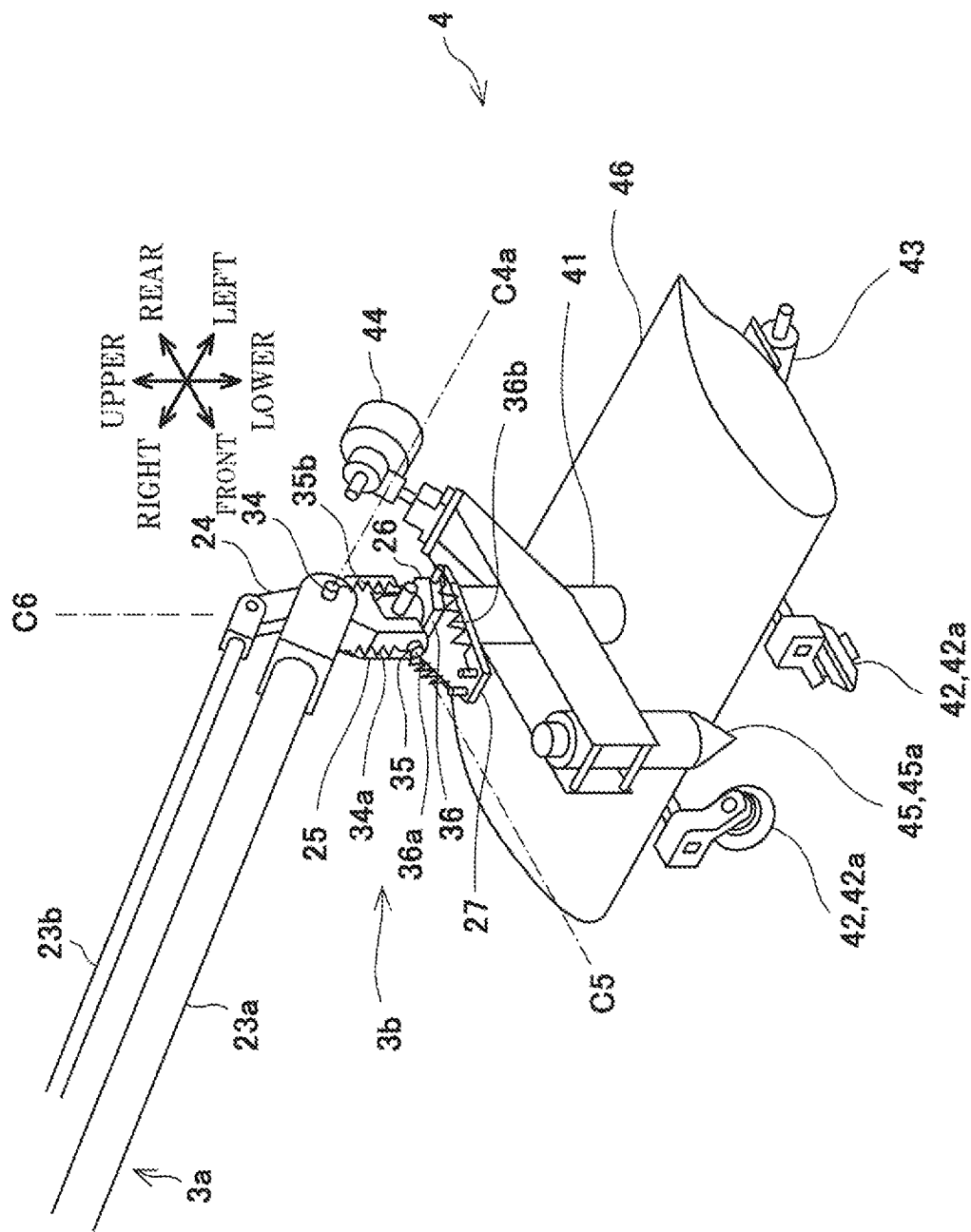
FIG. 3 is a perspective view showing a tip end portion of a robot arm of the AUV of FIG. 1, the vicinity of the tip end portion of the robot arm, and an inspection tool portion of the AUV.

FIG. 3 is a perspective view showing a tip end portion of the robot arm 3, the vicinity of the tip end portion of the robot arm 3, and the inspection tool portion 4. When the inspection tool portion 4 is not in contact with the seabed pipeline X, each of the links 25 to 27 as the passive arm portion 3b is located at a predetermined neutral position relative to the fourth link 24 that is a tip end portion of the active arm portion 3a. Specifically, a pair of first biasing members 34a and 34b, a pair of second biasing members 35a and 35b, and a pair of third biasing members 36a and 36b are provided at the passive arm portion 3b. The pair of first biasing members 34a and 34b, the pair of second biasing members 35a and 35b, and the pair of third biasing members 36a and 36b are, for example, coil springs.

One end of the first biasing member 34a and one end of the first biasing member 34b are fixed to the fourth link 24, and the other end of the first biasing member 34a and the other end of the first biasing member 34b are fixed to the fifth link 25. The pair of first biasing members 34a and 34b are provided parallel to each other so as to sandwich the fourth axis C4a. When a rotational position of the fifth link 25 relative to the fourth link 24 is a predetermined neutral position, biasing force of the first biasing member 34a and biasing force of the first biasing member 34b are balanced. When the fifth link 25 rotates relative to the fourth link 24 from the neutral position, the pair of first biasing members 34a and 34b generate the biasing force acting in such a direction that the fifth link 25 returns to the neutral position.

One end of the second biasing member 35a and one end of the second biasing member 35b are fixed to the fifth link 25, and the other end of the second biasing member 35a and the other end of the second biasing member 35b are fixed to the sixth link 26. The pair of second biasing members 35a and 35b are provided parallel to each other so as to sandwich the fifth axis C5. When the rotational position of the sixth link 26 relative to the fifth link 25 is a predetermined neutral position, biasing force of the second biasing member 35a and biasing force of the second biasing member 35b are balanced. When the sixth link 26 rotates relative to the fifth link 25 from the neutral position, the pair of second biasing members 35a and 35b generate the biasing force acting in such a direction that the sixth link 26 returns to the neutral position.

One end of the third biasing member 36a and one end of the third biasing member 36b are fixed to the sixth link 26, and the other end of the third biasing member 36a and the other end of the third biasing member 36b are fixed to the seventh link 27. The pair of third biasing members 36a and 36b are provided parallel to each other so as to sandwich the sixth axis C6. When the rotational position of the seventh link 27 relative to the sixth link 26 is a predetermined neutral position, biasing force of the third biasing member 36a and biasing force of the third biasing member 36b are balanced. When the seventh link 27 rotates relative to the sixth link 26 from the neutral position, the pair of third biasing members 36a and 36b generate the biasing force acting in such a direction that the seventh link 27 returns to the neutral position.

The inspection tool portion 4 includes: a frame 41 fixed to the seventh link 27; and four wheels 42 supported by the frame 41 and serving as a contact portion configured to contact the seabed pipeline X. In the present embodiment, the frame 41 is constituted by coupling a plurality of frame members and the like. The four wheels 42 are arranged along the seabed pipeline X so as to travel on the seabed pipeline X.

In the following description regarding the inspection tool portion 4, a traveling direction in which the inspection tool portion 4 travels on the seabed pipeline X is defined as a front direction, and a direction opposite to the traveling direction is defined as a rear direction. Moreover, left, right, upper, and lower sides in the traveling direction are defined as left, right, upper, and lower sides, respectively.

Figure 4:
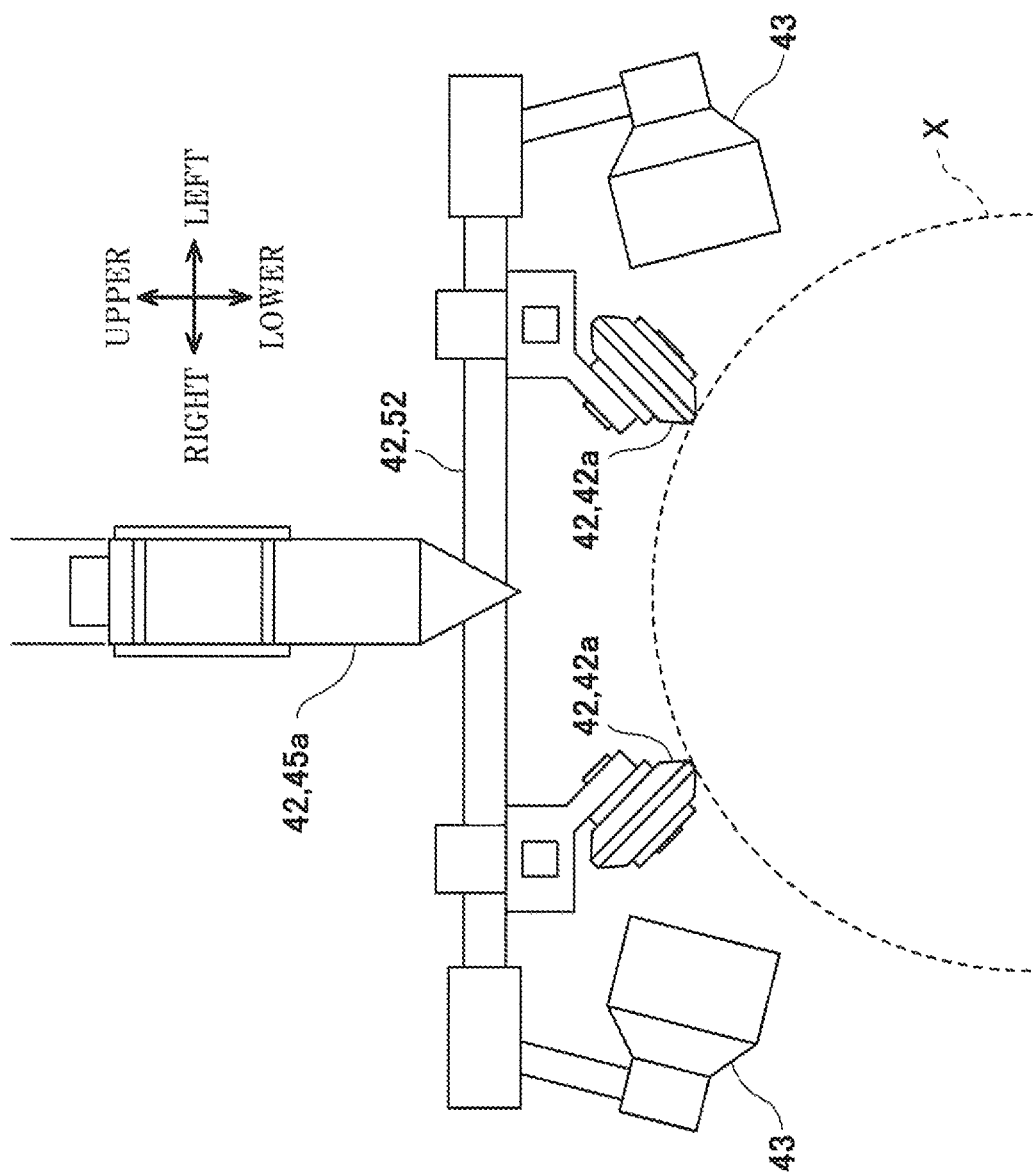
FIG. 4 is a partial front view showing the inspection tool portion of FIG. 3 to explain a contact state of the inspection tool portion with an inspection object.

FIG. 4 is a partial front view showing the inspection tool portion 4 to explain a contact state of the inspection tool portion 4 with the seabed pipeline X. In the present embodiment, among the four wheels 42, two wheels (front wheels) 42a are arranged at the front side of the frame 41 so as to be opposed to each other in the left-right direction of the inspection tool portion 4, and the remaining two wheels (rear wheels) 42b are arranged at the rear side of the frame 41 so as to be opposed to each other in the left-right direction of the inspection tool portion 4 (see FIG. 2, for example).

The pair of front wheels 42a contact the seabed pipeline X so as to sandwich the seabed pipeline X in a width direction. Similarly, the pair of rear wheels 42b contact the seabed pipeline X so as to sandwich the seabed pipeline X in the width direction. The pair of front wheels 42a and the pair of rear wheels 42b are arranged such that rotary surfaces thereof extend toward a middle portion of the seabed pipeline X. In other words, each of rotation axes of the wheels 42 is inclined so as to be located at the upper side as the rotation axis extends toward a middle side of the inspection tool portion 4 in the left-right direction.

A first camera 43 and a second camera 43 are supported by the frame 41. As shown in FIG. 4, when the four wheels 42 are in contact with the seabed pipeline X, the first and second cameras 43 take images of left and right side surfaces of the seabed pipeline X. An operator can visually inspect the left and right side surfaces of the seabed pipeline X by the taken images.

Moreover, a third camera 44 is supported by the frame 41. As shown in FIG. 3, when the four wheels 42 are in contact with the seabed pipeline X, the third camera 44 takes an image of an upper surface of the seabed pipeline X. The operator can visually inspect the upper surface of the seabed pipeline X by the taken image.

Furthermore, a corrosion prevention inspection device 45 is supported by the frame 41. The corrosion prevention inspection device 45 serves as an inspection device configured to inspect the seabed pipeline X. The corrosion prevention inspection device 45 inspects the degree of deterioration of an anticorrosive treatment (anticorrosive coating, for example) over the entire length of the seabed pipeline X. The corrosion prevention inspection device 45 includes a potential measurement probe 45a and a remote electrode (not shown). The potential measurement probe 45a is arranged such that a tip end portion thereof is located close to the upper surface of the seabed pipeline X.

The inspection tool portion 4 includes an interval changing mechanism 50 configured to narrow an interval H between the passive arm portion 3b and the wheels 42 as pressing force by which the four wheels 42 are pressed against the seabed pipeline X increases. The interval changing mechanism 50 will be described with reference to FIGS. 5A to 5C.

Figure 5A:
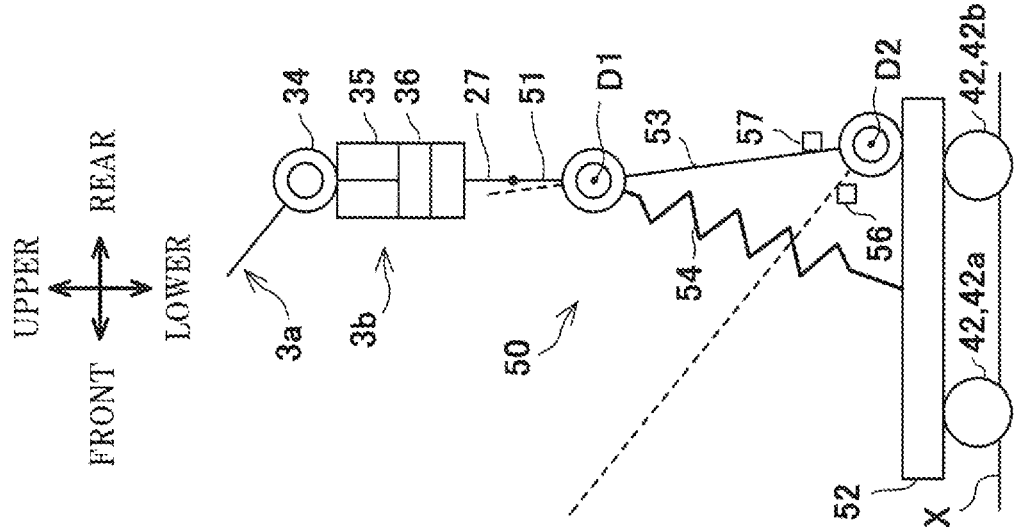
FIGS. 5A to 5C are schematic side views each showing the inspection tool portion of FIG. 3 to explain an interval changing mechanism of the inspection tool portion.
Figure 5B:
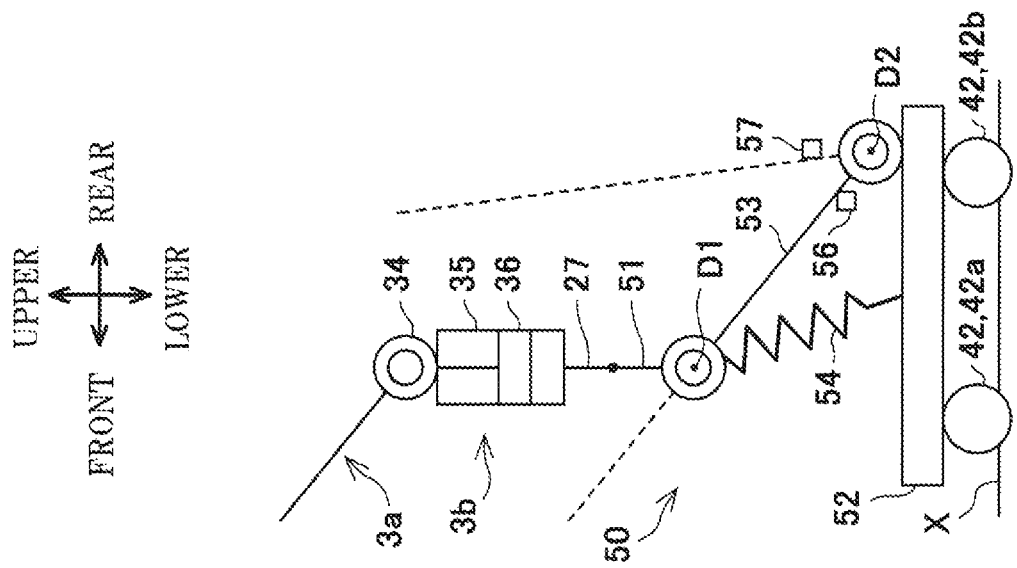
Figure 5C:
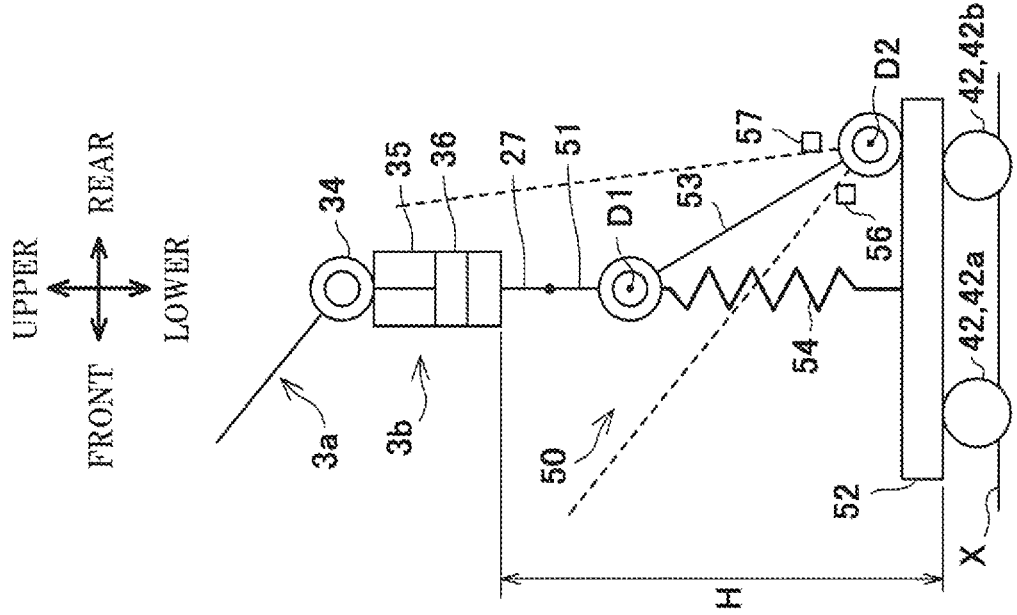

FIG. 5A is a schematic side view showing the inspection tool portion 4 to explain the interval changing mechanism 50 of the inspection tool portion 4. In FIGS. 5A to 5C, components of the inspection tool portion 4 which are not related to the interval changing mechanism 50 are omitted. The frame 41 of the inspection tool portion 4 includes a first frame portion 51 and a second frame portion 52. The first frame portion 51 is fixed to the seventh link 27, and the second frame portion 52 supports the four wheels 42. In the present embodiment, the interval changing mechanism 50 includes the first frame portion 51, the second frame portion 52, a connecting member 53, and a biasing member 54. The connecting member 53 and the biasing member 54 are provided between the first frame portion 51 and the second frame portion 52.

The first frame portion 51 and the second frame portion 52 are coupled to each other so as to be displaceable relative to each other in the upper-lower direction of the inspection tool portion 4. In the present embodiment, the first frame portion 51 is coupled to the connecting member 53 so as to turn relative to the second frame portion 52 about an axis parallel to the fourth axis C4a. The connecting member 53 is an elongated member and couples the first frame portion 51 and the second frame portion 52. One of longitudinal ends of the connecting member 53 is coupled to the first frame portion 51 so as to be rotatable about an axis D1 parallel to the fourth axis C4a, and the other longitudinal end of the connecting member 53 is coupled to the second frame portion 52 so as to be rotatable about an axis D2 parallel to the fourth axis C4a.

The biasing member 54 is, for example, a coil spring. The biasing member 54 couples the first frame portion 51 and the second frame portion 52 and generates biasing force in accordance with the interval H. Specifically, when the interval H narrows by the contact of the four wheels 42, the biasing member 54 generates the biasing force corresponding to the interval H. The second frame portion 52 is pressed against the seabed pipeline X by the biasing force of the biasing member 54. Therefore, as described below, the controller 12 operates the active arm portion 3a to adjust an interval between one end and the other end of the biasing member 54 such that the inspection tool portion 4 is pressed against the seabed pipeline X by appropriate force.

When the four wheels 42 are brought into contact with the seabed pipeline X by the operation of the active arm portion 3a, the interval changing mechanism 50 changes the interval between the passive arm portion 3b and the four wheels 42. Therefore, the interval changing mechanism 50 also serves as an impact absorbing mechanism configured to absorb impact force applied from the wheels 42 to the seabed pipeline X.

The inspection tool portion 4 includes a contact detecting portion 55 (see FIG. 6) configured to detect the contact of at least one of the four wheels 42 with the seabed pipeline X. The contact detecting portion 55 is, for example, a limit switch. For example, the contact detecting portion 55 is provided for each of the four wheels 42.

The inspection tool portion 4 includes a first interval detecting portion 56 and a second interval detecting portion 57 each configured to detect the interval H changed by the interval changing mechanism 50.

In the present embodiment, the controller 12 controls the operation of the active arm portion 3a such that the interval H changed by the interval changing mechanism 50 falls within a predetermined target interval range. For example, the first interval detecting portion 56 is a limit switch configured to detect the position of the connecting member 53 when the interval H has reached a lower limit of the target interval range, and the second interval detecting portion 57 is a limit switch configured to detect the position of the connecting member 53 when the interval H has reached an upper limit of the target interval range.

FIG. 5B shows that the interval H changed by the interval changing mechanism 50 has reached the lower limit of the target interval range, and FIG. 5C shows that the interval H changed by the interval changing mechanism 50 has reached the upper limit of the target interval range. The first interval detecting portion 56 detects that the interval H changed by the interval changing mechanism 50 has reached the lower limit of the target interval range (see FIG. 5B). The second interval detecting portion 57 detects that the interval H changed by the interval changing mechanism 50 has reached the upper limit of the target interval range (see FIG. 5C).

The contact detecting portion 55, the first interval detecting portion 56, and the second interval detecting portion 57 are supported by, for example, the second frame portion 52. Detection signals of the contact detecting portion 55, the first interval detecting portion 56, and the second interval detecting portion 57 are transmitted to the controller 12. Based on the detection signals of the contact detecting portion 55, the first interval detecting portion 56, and the second interval detecting portion 57, the controller 12 controls the first to third driving portions 61 to 63 such that the interval H falls within the target interval range.

Figure 6:
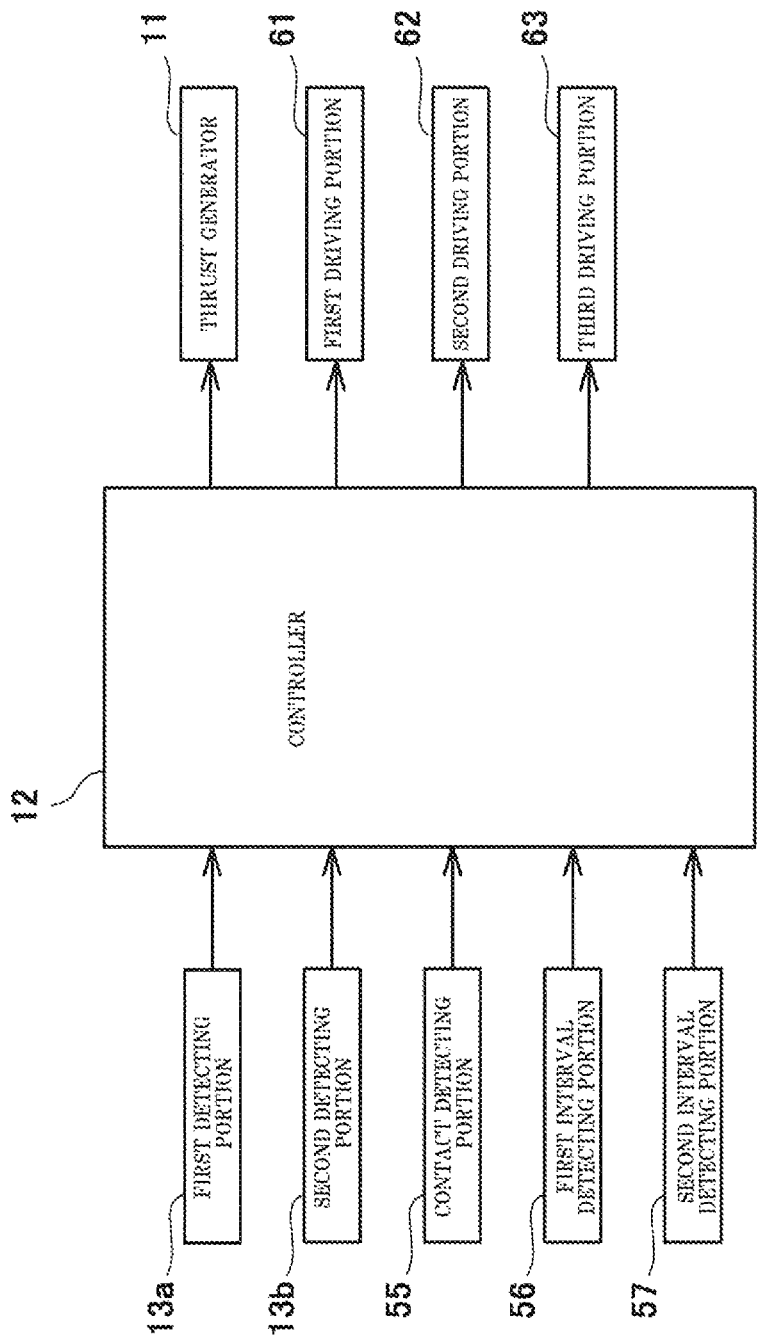
FIG. 6 is a block diagram showing the configuration of a control system of the AUV of FIG. 1.

FIG. 6 is a block diagram showing the configuration of a control system of the AUV 1. As described above, the controller 12 controls the thrust generator 11 based on the inspection object information acquired by the first detecting portion 13a and the second detecting portions 13b such that the main body portion 10 sails while tracing the seabed pipeline X without contacting the seabed pipeline X.

Moreover, the controller 12 drives the first to third driving portions 61 to 63 to operate the active arm portion 3a such that the inspection tool portion 4 realizes a preset target positional relation relative to the seabed pipeline X. It should be noted that the target positional relation of the inspection tool portion 4 relative to the seabed pipeline X in the present embodiment is such a positional relation that the inspection tool portion 4 is located substantially right above a center axis of the seabed pipeline X and travels in a state of contacting the upper surface of the seabed pipeline X.

The controller 12 controls the operation of the active arm portion 3a based on the detection signals acquired from the first interval detecting portion 56 and the second interval detecting portion 57 such that the interval H changed by the interval changing mechanism 50 falls within the predetermined target interval range.

Specifically, as shown in FIG. 5B, when the first interval detecting portion 56 detects that the interval H has reached the lower limit of the target interval range, the controller 12 drives the third driving portion 63 based on the detection signal acquired from the first interval detecting portion 56 such that the tip end portion of the active arm portion 3a separates from the seabed pipeline X. Moreover, as shown in FIG. 5C, when the second interval detecting portion 57 detects that the interval H has reached the upper limit of the target interval range, the controller 12 drives the third driving portion 63 based on the detection signal acquired from the second interval detecting portion 57 such that the tip end portion of the active arm portion 3a approaches the seabed pipeline X. Since the interval H between the passive arm portion 3b and the wheel 42 is made to fall within the predetermined range as above, the passive arm portion 3b is prevented from excessively pressing the seabed pipeline X, or the passive arm portion 3b is prevented from separating from the seabed pipeline X.

As shown in FIGS. 2 and 3, the inspection tool portion 4 includes a blade member 46. When the inspection tool portion 4 travels along the seabed pipeline X, the blade member 46 generates force of pressing the inspection tool portion 4 against the seabed pipeline X. In FIG. 4, the blade member 46 is omitted. The inspection tool portion 4 includes an inclination changing mechanism 70 configured to change an inclination of the blade member 46 relative to the seabed pipeline X.

FIGS. 7A and 7B are schematic side views showing the inspection tool portion 4 to explain the inclination changing mechanism 70 of the inspection tool portion 4. FIG. 7A shows that the inspection tool portion 4 is not traveling, and FIG. 7B shows that the inspection tool portion 4 is traveling.

In the present embodiment, as shown in FIG. 7A, the shape of a section of the blade member 46 which section is perpendicular to the left-right direction of the inspection tool portion 4 is an airfoil shape, and a camber line of the section is convex downward. The inclination changing mechanism 70 includes a shaft portion 71 and a biasing member 72. The shaft portion 71 extends in the left-right direction and supports the blade member 46 at the frame 41 (more specifically, at the second frame portion 52) such that the blade member 46 is rotatable. The biasing member 72 is provided behind the shaft portion 71. The biasing member 72 is, for example, a coil spring and is arranged between the blade member 46 and the frame 41 (more specifically, the second frame portion 52). As shown in FIG. 7A, when the inspection tool portion 4 is not traveling (in other words, when the biasing force of the biasing member 72 is not being generated), the blade member 46 is inclined relative to the seabed pipeline X such that a front edge thereof is located lower than a rear edge thereof.

As shown in FIG. 7B, when the inspection tool portion 4 travels on the seabed pipeline X, the blade member 46 receives the flow of the water from the front. With this, water pressure at an upper surface side of the blade member 46 becomes larger than water pressure at a lower surface side of the blade member 46, and therefore, downward force acts on the blade member 46 as a whole. Thus, the downward force acting from the water to the blade member 46 is transmitted through the shaft portion 71 to the frame 41. As a result, this force becomes force of pressing the four wheels 42 against the seabed pipeline X. Therefore, when the inspection tool portion 4 travels along the seabed pipeline X, the four wheels 42 hardly separate from the seabed pipeline X.

For example, when the inclination of the blade member 46 relative to the seabed pipeline X is constant, the force of pressing the four wheels 42 against the seabed pipeline X by the blade member 46 increases as the flow velocity of the water received by the blade member 46 increases. In order to prevent the pressing force from becoming excessive, in the present embodiment, the inclination changing mechanism 70 changes the inclination of the blade member 46 relative to the seabed pipeline X in accordance with the flow velocity of the water received by the blade member 46.

Specifically, when the blade member 46 receives the flow of the water from the front, rotational force around the shaft portion 71 which force reduces the water pressure difference between the upper surface side and lower surface side of the blade member 46, in other words, rotational force which reduces the inclination of the blade member 46 relative to the direction in which the inspection tool portion 4 travels (i.e., the direction in which the seabed pipeline X extends) acts on the blade member 46 from the water around the blade member 46. On the other hand, the applying member 62 generates biasing force against the rotational force to maintain the inclination of the blade member 46 relative to the front-rear direction of the inspection tool portion 4 at a fixed level or more. Thus, the inclination changing mechanism 70 changes the inclination of the blade member 46 relative to the seabed pipeline X in accordance with the flow velocity of the water received by the blade member 46 such that the force generated by the blade member 46 is maintained within the predetermined range. Thus, the force of pressing the wheels 42 against the seabed pipeline X can be prevented from becoming too large.

According to the AUV 1 of the present embodiment described above, the fourth to sixth joints 34 to 36 of the robot arm 3 are the passive joints and allow the passive rotation of the inspection tool portion 4 relative to the active arm portion 3a about the three axes C4a, C5, and C6 perpendicular to each other. With this, even when the direction of the underwater vehicle main body 2 relative to the seabed pipeline X is changed to any direction, the rotational displacement of the underwater vehicle main body 2 can be prevented from being transmitted to the inspection tool portion 4.

Therefore, the direction of the inspection tool portion 4 relative to the seabed pipeline X can be maintained. As a result, the seabed pipeline X can be inspected with a high degree of accuracy while suppressing the consumption of the electric power of the battery incorporated in the AUV 1.

Moreover, in the present embodiment, the pair of front wheels 42a contact the seabed pipeline X so as to sandwich the seabed pipeline X in the width direction, and the pair of rear wheels 42b also contact the seabed pipeline X so as to sandwich the seabed pipeline X in the width direction. Therefore, even when the direction of the underwater vehicle main body 2 relative to the seabed pipeline X changes about an axis (axis C6) perpendicular to both the extending direction and width direction of the seabed pipeline X, the passive joint (sixth joint 36) can allow the passive rotation of the inspection tool portion 4 relative to the active arm portion 3a such that the inspection tool portion 4 is prevented from rotating about the axis by contact force acting on the wheels 42 in the width direction from the seabed pipeline X.

In the present embodiment, the pair of first biasing members 34a and 34b, the pair of second biasing members 35a and 35b, and the pair of third biasing members 36a and 36b are provided at the passive arm portion 3b. With this, when the wheels 42 are not in contact with the seabed pipeline X, the rotational position of the inspection tool portion 4 relative to the active arm portion 3a is the neutral position, and therefore, the inspection tool portion 4 in a desired posture can be made to approach the seabed pipeline X.

Moreover, in the present embodiment, since the inspection tool portion 4 includes the contact detecting portion 55, the controller 12 can utilize the signal of the contact detecting portion 55 to quickly determine whether or not the inspection tool portion 4 is in a state of being able to inspect the seabed pipeline X.

The present invention is not limited to the above embodiment, and various modifications may be made within the scope of the present invention.

For example, the inspection object is not limited to the seabed pipeline X and may be a structure in water. Moreover, the inspection object may be different in shape from the seabed pipeline. For example, the inspection object may extend in the upper-lower direction in the water. Moreover, the inspection object may have a planar shape. In this case, the rotation axes of the four wheels 42 may be parallel to each other. Furthermore, when the inspection object, such as the planar inspection object, does not have a portion which cannot be sandwiched by the contact portion of the inspection tool portion 4 in the left-right direction, the contact portion of the present invention does not have to contact the inspection object so as to sandwich the inspection object.

In the above embodiment, the underwater vehicle main body 2 sails while tracing the seabed pipeline X without contacting the seabed pipeline X. However, the underwater vehicle main body 2 may sail along the inspection object while contacting the inspection object.

In the above embodiment, the robot arm 3 includes the three passive joints having respective joint axes perpendicular to each other. However, the number of passive joints is not limited to this. The AUV of the present invention is only required to have a passive joint configured to allow passive rotation of the inspection tool portion 4 relative to the active arm portion 3a about at least one axis. In this case, even when the direction of the underwater vehicle main body 2 relative to the inspection object changes to some extent, the direction of the inspection tool portion 4 relative to the inspection object about at least one axis can be maintained. Therefore, the inspection object can be inspected with a high degree of accuracy while suppressing the consumption of the electric power of the battery incorporated in the underwater vehicle main body. Moreover, instead of the three passive joints having the respective joint axes perpendicular to each other, the robot arm 3 may include, as the passive joint, a spherical joint configured to allow passive three-degree-of-freedom rotation of the inspection tool portion 4 relative to the arm.

For example, when the inspection object has a planar shape, the AUV does not have to include a passive joint configured to allow passive rotation of the inspection tool portion 4 relative to the active arm portion 3a about an axis perpendicular to the plane of the inspection object.

In the above embodiment, the pair of first biasing members 34a and 34b generate the biasing force acting in such a direction that the fifth link 25 returns to the neutral position. However, such pair of biasing members do not have to be provided, and only one biasing member may be provided. The same is true for the pair of second biasing members 35a and 35b and the pair of third biasing members 36a and 36b.

In the above embodiment, the inspection tool portion 4 includes the contact detecting portion 55. However, the inspection tool portion 4 does not have to include the contact detecting portion 55. For example, on the basis that the signal from the second interval detecting portion 57 (i.e., the signal indicating that the interval H has reached the upper limit of the target interval range) has become an off state, the controller 12 may determine that the wheels 42 are brought into contact with the inspection object.

The configuration of the interval changing mechanism 50 of the inspection tool portion 4 is not limited to the configuration described in the above embodiment. For example, in the above embodiment, the first frame portion 51 is coupled to the connecting member 53 so as to turn relative to the second frame portion 52 about the axis parallel to the fourth axis C4a. However, the first frame portion 51 may be coupled so as to be linearly displaceable relative to the second frame portion 52 in the upper-lower direction of the inspection tool portion 4.

In the above embodiment, the blade member 46 is supported by the frame 41 such that the inclination thereof is changeable. However, the blade member 46 may be fixed to the frame 41 such that the inclination thereof relative to the frame 41 does not change. Moreover, the shape of the section of the blade member 46 does not have to be the airfoil shape. For example, the blade member 46 may be a flat plate member including two main surfaces parallel to each other. When the force of pressing the wheels 46 against the inspection object can be adequately secured by the biasing member 54, the inspection tool portion 4 does not have to include the blade member 46.

The shapes and configurations of the underwater vehicle main body 2, the robot arm 3, and the inspection tool portion are not limited to those described in the above embodiment. The underwater vehicle main body 2 does not have to include the cover portion 14. Even in this case, when the inspection tool portion 4 is positioned at the stand-by position P2, the sailing direction of the underwater vehicle main body 2 and the direction in which the third link 23 extends can be made to coincide with each other, and therefore, the water resistance received by the active arm portion 3a can be suppressed to some extent. The robot arm 3 may be coupled to the front portion or rear portion of the underwater vehicle main body 2 instead of the lower portion of the underwater vehicle main body 2. The robot arm 3 does not have to be the six-axis articulated robot arm and may be a five or less-axis articulated robot arm or a seven or more-axis articulated robot arm.

In the above embodiment, the inspection device included in the inspection tool portion is the corrosion prevention inspection device 45. However, the inspection device included in the inspection tool portion is not limited to this. For example, the inspection device included in the inspection tool portion may be a thickness inspection device capable of inspecting the thickness of the seabed pipeline X over the entire length of the seabed pipeline X by using ultrasound or the like.

In the above embodiment, the detecting portion 13 including the first detecting portion 13a and the two second detecting portions 13b is described as the detecting portion 13 configured to acquire the inspection object information. However, the detecting portion 13 may include only one of the first detecting portion 13a and the second detecting portions 13b or may include a detecting portion having a different configuration in addition to or instead of the first detecting portion 13a and the second detecting portions 13b. Moreover, the position of the detecting portion 13 in the underwater vehicle main body 2 and the number of detecting portions 13 in the underwater vehicle main body 2 are not limited to those in the above embodiment.

REFERENCE SIGNS LIST

1 AUV (autonomous underwater vehicle)
2 underwater vehicle main body
3a active arm portion (arm)
3b passive arm portion
4 inspection tool portion
12 controller
14 cover portion
34 fourth joint (passive joint)
34a, 34b first biasing member (biasing member)
35 fifth joint (passive joint)
35a, 35b second biasing member (biasing member)
36 sixth joint (passive joint)
36a, 36b third biasing member (biasing member)
42 wheel (contact portion)
45 corrosion prevention inspection device (inspection device)
46 blade member
50 interval changing mechanism
55 contact detecting portion
56 first interval detecting portion (interval detecting portion)
57 second interval detecting portion (interval detecting portion)
60 inclination changing mechanism
61 first driving portion (driving portion)
62 second driving portion (driving portion)
63 third driving portion (driving portion)
P1 work position
P2 stand-by position
X seabed pipeline (inspection object)

The invention claimed is:

1. An autonomous underwater vehicle comprising:
    an underwater vehicle main body configured to sail along an inspection object located in water or on a bottom of the water;
    an arm extending from the underwater vehicle main body;
    an inspection tool portion connected to the underwater vehicle main body through the arm and including
        a contact portion configured to contact the inspection object and
        an inspection device configured to inspect the inspection object; and
    a passive joint provided between the arm and the inspection tool portion and configured to allow passive rotation of the inspection tool portion relative to the arm about at least one axis.

2. The autonomous underwater vehicle according to claim 1, wherein the passive joint allows the passive rotation of the inspection tool portion relative to the arm about three axes perpendicular to each other.

3. The autonomous underwater vehicle according to claim 1, wherein:
    the inspection object extends in a predetermined direction in the water or on the bottom of the water;
    the contact portion contacts the inspection object so as to sandwich the inspection object in a width direction of the inspection object; and
    the at least one axis comprises an axis perpendicular to both an extending direction in which the inspection object extends and the width direction.

4. The autonomous underwater vehicle according to claim 1, wherein:
    when the contact portion is not in contact with the inspection object, a rotational position of the inspection tool portion relative to the arm about the at least one axis is a neutral position; and
    the autonomous underwater vehicle comprises a biasing member configured to, when the inspection tool portion rotates relative to the arm from the neutral position, generate biasing force acting in such a direction that the inspection tool portion returns to the neutral position.

5. The autonomous underwater vehicle according to claim 1, wherein the underwater vehicle main body includes:
    a driving portion configured to drive the arm such that the inspection tool portion moves between a work position at which the contact portion contacts the inspection object and a stand-by position located closer to the underwater vehicle main body than the work position; and
    a cover portion overlapping the arm so as to hide the arm when the inspection tool portion is located at the stand-by position in a front view of the underwater vehicle main body.

6. The autonomous underwater vehicle according to claim 1, wherein the inspection tool portion includes a contact detecting portion configured to detect contact of the contact portion with the inspection object.

7. The autonomous underwater vehicle according to claim 1, wherein:
the underwater vehicle main body includes
a driving portion configured to drive the arm to move the inspection tool portion and
a controller configured to control the driving portion;
the autonomous underwater vehicle comprises
an interval changing mechanism configured to narrow an interval between the passive joint and the contact portion as pressing force of pressing the contact portion against the inspection object increases and
an interval detecting portion configured to detect the interval; and
the controller controls the driving portion based on a detection signal of the interval detecting portion such that the interval falls within a predetermined range.

8. The autonomous underwater vehicle according to claim 1, wherein the inspection tool portion includes a blade member configured to receive a flow of the water to generate force acting in such a direction that the contact portion is pressed against the inspection object.

9. The autonomous underwater vehicle according to claim 8, wherein the inspection tool portion includes an inclination changing mechanism configured to change an inclination of the blade member relative to the inspection object in accordance with a flow velocity of the water received by the blade member such that the force generated by the blade member is maintained within a predetermined range.

10. An autonomous underwater vehicle comprising:
an underwater vehicle main body configured to sail along an inspection object located in water or on a bottom of the water;
an arm extending from the underwater vehicle main body;
an inspection tool portion including
a contact portion configured to contact the inspection object and
an inspection device configured to inspect the inspection object; and
a passive joint provided between the arm and the inspection tool portion and configured to allow passive rotation of the inspection tool portion relative to the arm about at least one axis, wherein:
when the contact portion is not in contact with the inspection object, a rotational position of the inspection tool portion relative to the arm about the at least one axis is a neutral position; and
the autonomous underwater vehicle comprises a biasing member configured to, when the inspection tool portion rotates relative to the arm from the neutral position, generate biasing force acting in such a direction that the inspection tool portion returns to the neutral position.

11. The autonomous underwater vehicle according to claim 10, wherein:
the inspection object extends in a predetermined direction in the water or on the bottom of the water;
the contact portion contacts the inspection object so as to sandwich the inspection object in a width direction of the inspection object; and
the at least one axis comprises an axis perpendicular to both an extending direction in which the inspection object extends and the width direction.

12. The autonomous underwater vehicle according to claim 10, wherein the underwater vehicle main body includes:
a driving portion configured to drive the arm such that the inspection tool portion moves between a work position at which the contact portion contacts the inspection object and a stand-by position located closer to the underwater vehicle main body than the work position; and
a cover portion overlapping the arm so as to hide the arm when the inspection tool portion is located at the stand-by position in a front view of the underwater vehicle main body.

13. The autonomous underwater vehicle according to claim 10, wherein the inspection tool portion includes a contact detecting portion configured to detect contact of the contact portion with the inspection object.

14. The autonomous underwater vehicle according to claim 10, wherein the inspection tool portion includes a blade member configured to receive a flow of the water to generate force acting in such a direction that the contact portion is pressed against the inspection object.

15. An autonomous underwater vehicle comprising:
an underwater vehicle main body configured to sail along an inspection object located in water or on a bottom of the water;
an arm extending from the underwater vehicle main body;
an inspection tool portion including
a contact portion configured to contact the inspection object and
an inspection device configured to inspect the inspection object; and
a passive joint provided between the arm and the inspection tool portion and configured to allow passive rotation of the inspection tool portion relative to the arm about at least one axis, wherein:
the underwater vehicle main body includes
a driving portion configured to drive the arm to move the inspection tool portion and
a controller configured to control the driving portion;
the autonomous underwater vehicle comprises
an interval changing mechanism configured to narrow an interval between the passive joint and the contact portion as pressing force of pressing the contact portion against the inspection object increases and
an interval detecting portion configured to detect the interval; and
the controller controls the driving portion based on a detection signal of the interval detecting portion such that the interval falls within a predetermined range.

16. The autonomous underwater vehicle according to claim 15, wherein:
the inspection object extends in a predetermined direction in the water or on the bottom of the water;
the contact portion contacts the inspection object so as to sandwich the inspection object in a width direction of the inspection object; and
the at least one axis comprises an axis perpendicular to both an extending direction in which the inspection object extends and the width direction.

17. The autonomous underwater vehicle according to claim 15, wherein the underwater vehicle main body includes:
a driving portion configured to drive the arm such that the inspection tool portion moves between a work position at which the contact portion contacts the inspection object and a stand-by position located closer to the underwater vehicle main body than the work position; and
a cover portion overlapping the arm so as to hide the arm when the inspection tool portion is located at the stand-by position in a front view of the underwater vehicle main body.

18. The autonomous underwater vehicle according to claim 15, wherein the inspection tool portion includes a contact detecting portion configured to detect contact of the contact portion with the inspection object.

19. The autonomous underwater vehicle according to claim 15, wherein the inspection tool portion includes a blade member configured to receive a flow of the water to generate force acting in such a direction that the contact portion is pressed against the inspection object.

20. The autonomous underwater vehicle according to claim 19, wherein the inspection tool portion includes an inclination changing mechanism configured to change an inclination of the blade member relative to the inspection object in accordance with a flow velocity of the water received by the blade member such that the force generated by the blade member is maintained within a predetermined range.

* * * * *